United States Patent [19]

Nakayama

[11] Patent Number: 5,646,808
[45] Date of Patent: Jul. 8, 1997

[54] ELECTROSTATIC BREAKDOWN PROTECTION CIRCUIT FOR A SEMICONDUCTOR INTEGRATED CIRCUIT DEVICE

[75] Inventor: Osamu Nakayama, Haga-gun, Japan

[73] Assignee: Kawasaki Steel Corporation, Kobe, Japan

[21] Appl. No.: 511,894

[22] Filed: Aug. 7, 1995

Related U.S. Application Data

[63] Continuation-in-part of Ser. No. 509,943, Aug. 1, 1995, abandoned.

[30] Foreign Application Priority Data

Aug. 5, 1994 [JP] Japan ................................ 6-184327

[51] Int. Cl.$^6$ .................................................. H02H 9/04
[52] U.S. Cl. ............................ 361/56; 361/111; 257/355
[58] Field of Search ............................ 361/56, 58, 91, 361/111; 257/355, 361, 362, 356–360

[56] References Cited

U.S. PATENT DOCUMENTS

| | | | |
|---|---|---|---|
| 4,037,140 | 7/1977 | Eaton, Jr. ............................ | 361/56 |
| 4,630,162 | 12/1986 | Bell et al. ............................ | 361/56 |
| 5,144,392 | 9/1992 | Brotherton ............................ | 361/56 |
| 5,290,724 | 3/1994 | Leach ............................ | 257/362 |

OTHER PUBLICATIONS

"Dynamic Gate Coupling of NMOS For Efficient Output ESD Protection", Charvaka Duvvury and Carlos Diaz, CH3084–1/92/0000–0141 1992 IEEE/IRPS, pp. 141–150.

Primary Examiner—Jeffrey A. Gaffin
Assistant Examiner—Michael J. Sherry
Attorney, Agent, or Firm—Oliff & Berridge

[57] ABSTRACT

A protection circuit for protecting against electrostatic discharges (ESD) applied to a bonding pad is connected to ground. The ESD is discharged to ground through the protection circuit, which includes a primary transistor for conducting the discharge current to ground and a gate voltage controlling circuit for controlling the gate voltage of the primary transistor. Operation of the protection circuits begins from a low electrostatic voltage, thereby positively enhancing the electrostatic voltage resistance. In particular, when the gate voltage controlling circuit is a secondary transistor, the source terminal of the primary transistor is connected to ground, and the drain terminal is connected to the bonding pad. The source terminal of the secondary transistor is also connected to ground. Its gate terminal and drain terminal are connected to the gate terminal of the primary transistor.

29 Claims, 8 Drawing Sheets

ELECTROSTATIC BREAKDOWN PROTECTION CIRCUIT FOR A SEMICONDUCTOR INTEGRATED CIRCUIT DEVICE

This invention is a continuation-in-part application of prior U.S. application No. 08/509,943, now abandoned, filed Aug. 1, 1995, for "A Protection Circuit Against Electro-Static Discharge" By Osamu Nakayama, the disclosure of which is incorporated herein by reference.

BACKGROUND OF THE INVENTION

1. Field of the Invention

This invention relates to a semiconductor integrated circuit device. In particular, it relates to a semiconductor integrated circuit device which has enhanced or improved tolerance or resistance to electrostatic discharges, by using a protective circuit which is capable of preventing deterioration of an internal element due to the occurrence of an electrostatic discharge.

2. Description of Related Art

During the assembly of an LSI chip into a package or during the transportation of the LSI chip package, deterioration or destruction of a portion of the internal elements of the LSI chip may occur due to an electrostatic discharge (ESD). Electrostatic discharge refers to the electrostatic discharge of electrified individuals or objects into the LSI chip through the external terminals of the LSI chip package. Alternately, the LSI chip itself may become electrified at the time of assembly or during transportation, and discharged to individuals or objects. As a result, deterioration or destruction of a portion of the internal element of the LSI chip may occur.

For example, as shown in FIG. 10, in the output circuit 40 of a conventional semiconductor integrated circuit device, such as a gate array, the gate terminal 32a, the source terminal 32b and the substrate of an unused NMOS transistor 32 are connected to ground. The drain terminal 32c of the unused NMOS transistor 32 is attached to a pad 16, such as a bonding pad or the like. In addition, although not shown in FIG. 10, in an unused PMOS transistor, the gate terminal, the source terminal and the substrate are connected to a power supply, such as a power bus. The drain terminal of the unused PMOS transistor is connected to the bonding pad 16. In the unused transistor 32 which is thus connected, in its ordinary operating state, since the gate terminal 32a, the source terminal 32b and the substrate are connected to each other and to ground, the unused transistor 32 does not influence any of the other circuits.

Therefore, when a voltage due to an electrostatic discharge is applied to the drain terminal 32c of the unused transistor 32, the voltage potential at the drain terminal 32c increases. When the voltage potential at the drain terminal 32c exceeds a specified value, a breakdown occurs in the p-n junction between the drain and the substrate of the unused transistor 32. Alternately, a punch through will occur between the drain and source.

In this case, when an excessive reverse voltage is applied across the p-n junction, the p-n junction is unable to withstand the reverse voltage. A breakdown phenomena will thus occur. That is, an electron will receive kinetic energy from the electrical field. The electron having such kinetic energy will impact into an atom of the crystal lattice, cutting its crystal lattice bond, and creating an electron/hole pair. The created electron will impact into a neighboring atom of the crystal lattice, creating an additional electron/hole pair, thus producing what is known as impact ionization. Through the successive creation of electron/hole pairs, a drain current begins to flow.

If a breakdown occurs, the drain voltage increases corresponding to the increase in the drain current. However, if the drain voltage continues to increase, and the drain current continues to flow to the substrate, the electric potential of the substrate will increase. In this case, a forward current will begin to flow to the junction between the substrate and the source of the unused transistor 32. Thus, the substrate, because it is grounded, serves as a base, the drain serves as a collector, the grounded source serves as an emitter of a parasitic npn bipolar transistor. When the current of the bipolar transistor is added to the breakdown current toward the substrate, the drain current increases drastically.

Such a breakdown is generally characteristic of a transistor having a p-n junction. However, in the unused transistor 32 in which the gate terminal 32, the source terminal 32b and the substrate are grounded, when a breakdown occurs, it is often the case that the current flows in only a limited portion of a region along the width of the gate terminal. That is, the current density is high. Since a high temperature is produced in that limited portion of the gate terminal, even if the current is small, the unused transistor 32 deteriorates due to the excess heat. This means that even if the current caused by electrostatic discharge is small, i.e., even if the voltage of the ESD is low, the unused transistor 32 easily deteriorates. In other words, the electrostatic voltage resistance (ESD resistance) of the unused transistor 32 is low.

Therefore, one method for overcoming the above-outlined problem is proposed in "Dynamic Gate Coupling of NMOS Efficient Output ESD Protection", IEEE/IRPS, 1992, pp 141". FIG. 11 shows the proposed solution. As shown in FIG. 11, a protection circuit 22 for providing increased ESD resistance to electrostatic discharges uses a gate coupling effect. The protection circuit 22 comprises an NMOS transistor 24, as a thin oxide film transistor, which discharges the electrostatic discharge applied to the bonding pad 16 to ground. The thin oxide film transistor 24 has a thin gate insulation film. The protection circuit 22 further comprises an NMOS transistor 26, as a field transistor. The field transistor 26 has a thick gate insulating film and controls the thin oxide film transistor 24.

In this instance, the source terminal 26b of the field transistor 26 is grounded. The gate terminal 26a of the field transistor 26 is connected to the bonding pad 16. The drain terminal 26c of the field transistor 26 is connected to the gate terminal 24a of the thin oxide film transistor 24. In addition, the source terminal 24b of the thin oxide film transistor 24 is grounded, while the drain terminal 24c is connected to the bonding pad 16. Furthermore, the threshold voltage of the field transistor 26 is higher than the threshold voltage of the thin oxide film transistor 24. Furthermore, as shown by the dotted line in FIG. 11, a parasitic capacitance 28 exists between the drain and the gate of the thin oxide film transistor 24.

In the protection circuit 22, the threshold voltage of the field transistor 26 is high, and the field transistor 26 is ordinarily in an OFF state. Thus, during ordinary operational conditions, the thin oxide film transistor 24 is also in the OFF state in ordinary operation. Because the gate terminal 24a is not being driven by anything else, the gate terminal 24a is in a floating state and is fixed at a ground electric potential due to the leakage current of the junction between the drain and substrate of the field transistor 26. Thus, the thin oxide film transistor 24 does not influence any other circuit operation.

On the other hand, when a voltage due to an electrostatic discharge is applied to the protection circuit 22, then along with an increase in the voltage applied to the drain terminal 24a of the thin oxide film transistor 24, the parasitic capacitance 28 existing between the gate and the drain of the thin oxide film transistor 24 is electrically charged. When the gate voltage of the thin oxide film transistor 24 exceeds the threshold voltage, then the thin oxide film transistor 24 is switched into the ON state. A channel is formed between the drain and source of the thin oxide film transistor 24, and a current begins to flow through the thin oxide film transistor 24 to ground. Thus, the voltage applied to the bonding pad 16 (the pad voltage), which is thus also the drain voltage of the thin oxide film transistor 24 and the gate voltage of the field transistor 26, is grounded, and the voltage on the bonding pad is clamped to the voltage corresponding to the ON resistance value of the channel formed between the drain and source of the thin oxide film transistor 24 and the drain current.

If the thin oxide film transistor 24 is switched into the ON state, and the drain voltage of the thin oxide film transistor 24 exceeds a pinch off voltage, then the drain current of the oxide film transistor 24 reaches a saturated value. However, the drain voltage is increased by the electrostatic discharge. If the pad voltage exceeds a specified value, a breakdown occurs in the p-n junction between the drain and the substrate of the thin oxide film transistor 24. Thus, a drain current also begins to flow between the drain and the substrate. In other words, the drain current further increases drastically and the pad voltage will be clamped to the value corresponding to the resistance value between the drain and substrate and the drain current. Also, since the thin oxide film transistor 24 is in the ON state, in comparison with the unused transistor 32 in which the gate terminal 32a, the source terminal 32b and the substrate are also grounded, the breakdown occurs in the p-n junction between the drain and substrate of the thin oxide film transistor 24 at a voltage lower by a few volts.

In this case, since breakdown occurs in the thin oxide film transistor 24 when it is in the ON state, along with the operation as an NMOS transistor with a channel, a parasitic bipolar npn transistor is formed from the drain, which serves as a collector of the parasitic transistor, a grounded substrate, which serves as a base of the parasitic transistor, and a grounded source which serves as an emitter of the parasitic transistor, and is switched to the ON state. The pad voltage further increases corresponding to increase in the drain current. When the pad voltage exceeds the threshold voltage of the field transistor 26, the field transistor 26 is switched to the ON state. As a result, the gate voltage of the thin oxide film transistor 24 is pulled off to the ground potential. Since the thin oxide film transistor 24 which serves as an NMOS transistor is thus turned OFF, static electricity is subsequently discharged by a drain current between the drain and the substrate of the thin oxide film transistor 24 by means of the parasitic bipolar npn transistor of the thin oxide film transistor 24.

As indicated above, in the protection circuit 22, when a breakdown occurs, since the thin oxide film transistor 24, which operates as an NMOS transistor, is in the ON state, a uniform flow of current is possible along the width of the gate of the thin oxide film transistor 24. That is, the current density is low. Since there is no localized generation of heat within the thin oxide film transistor 24, even if there is a great amount of current, there will be no heat-related deterioration of the thin oxide film transistor 24. By this means, an improvement is made in the electrostatic voltage resistance of the thin oxide film transistor 24.

However, since, in this protection circuit 22, the gate terminal 26a of the transistor 26 is directly connected to the bonding pad 16, to which the voltage from the electrostatic discharge is applied, the transistor 26 must be a field transistor. That is, if an ordinary thin gate oxide film NMOS transistor is used as the transistor 26, the thin gate oxide film will be destroyed when a high voltage is applied to the gate terminal 26a. Furthermore, since the field transistor 26 must be used, in order to increase the parasitic capacitance 28 between the gate and the drain of the thin oxide film transistor 24, the area of the field transistor 26 must be increased.

In addition, the switching speed of the field transistor 26 is slow in comparison to an electrostatic pulse which has a short rise time. Thus, it is extremely difficult to adjust the timing for switching the thin oxide film transistor 24 into the OFF state. Conversely, in order to increase the switching speed of the field transistor 26, the size of the field transistor 26 must be further enlarged. In addition, since the gate insulating film of the field transistor 26 is thick, the threshold voltage of the field transistor 26 becomes higher. Thus, a very high voltage should be applied to the gate of the field transistor 26, to switch the field transistor 26 to the ON state. In other words, the operation of the thin oxide film transistor 24 as an NMOS transistor cannot be switched to the OFF state quickly enough. Therefore, the thin oxide film transistor 24 is exposed to an electrostatic pulse, specifically to a pulse with a high voltage of 30–40 volts, for an extended period. Furthermore, the thin oxide film transistor 24 and the field transistor 26 to which the high voltage is applied may easily be destroyed by the electrostatic discharge, which comprises yet another problem.

SUMMARY OF THE INVENTION

One object of this invention is to overcome the various problems associated with the prior art technology. The protection circuit of this invention comprises a primary transistor which discharges an electrostatic discharge applied to a bonding pad to ground or to a power supply, a gate controlling circuit which is connected to the gate terminal of the primary transistor and which controls the gate voltage charged through a parasitic capacitance between the drain and the gate of the primary transistor. The protection circuit of this invention begins to operate at a lower electrostatic voltage and can respond to an electrostatic pulse with a short rise time. This thus provides the protection circuit with increased or enhanced electrostatic voltage resistance. In addition, this invention provides a semiconductor integrated circuit device which includes an input pad or an output pad which uses this protection circuit.

In order to achieve this and other objectives, this invention provides protection circuitry which includes a primary transistor which discharges the electrostatic discharge applied to the bonding pad to ground or to a power supply, and gate voltage controlling circuitry which places the primary transistor into a snap-back region by which the breakdown voltage is lower than the normal value. Specifically, in a first preferred embodiment, the source of the primary transistor is connected to one of ground or the power supply, and the drain is connected to the bonding pad. In order to control the gate voltage of the primary transistor, the source of a secondary transistor is also connected to one of ground or the power supply, wherein the gate and drain of the secondary transistor are connected together and connected to the gate of the primary transistor. In this first preferred embodiment, the ratio of W/L of the secondary transistor, where W is the gate width and L is the gate length, is preferably smaller than W/L of the primary transistor.

With the semiconductor integrated circuit device according to this invention, after an electrostatic discharge is applied to the bonding pad, the parasitic capacitance between the gate and drain of the primary transistor is charged, and the gate voltage rises. When the gate voltage exceeds the threshold voltage, the primary transistor switches to the ON state. Therefore, a channel is formed between the drain and the source of the primary transistor, through which the electrostatic discharge can be discharged to ground. Then, if the pad voltage continues to rise while the primary transistor is in the ON state, the primary transistor will produce an avalanche breakdown, and the parasitic bipolar transistor of the primary transistor will switch to the ON state. Thus, the electrostatic discharge can be discharged to ground through the parasitic bipolar transistor.

Furthermore, in comparison to the conventional transistor having its gate terminal connected to ground, when the primary transistor undergoes avalanche breakdown, the primary transistor, when it is in the ON state (i.e., when the channel of the primary transistor is formed between the drain and the source), uniformly produces the avalanche breakdown at a voltage lower by a few volts and uniformly along the width of the gate. In addition, the secondary transistor controls the gate voltage of the primary transistor within the vicinity of the threshold voltage of the primary transistor during the ESD event. This makes impact ionization easy to accomplish. In other words, the functioning of the parasitic bipolar transistor between the source and drain of the primary transistor is easily accomplished. The energy of the ESD is discharged to the substrate side, rather than to the surface of the transistor. Therefore, the electrostatic discharge passing through the channel is reduced, thereby preserving the primary transistor from a channel type breakdown.

Furthermore, when a breakdown occurs, a uniform flow of electric current can be accomplished through the primary transistor. In other words, the density of the electric current is low. Thus, a localized area of excessive heat is not produced, and there will be no destruction of the primary transistor, even if the amount of discharge current is large. Through the discharge through the primary transistor, an LSI chip having enhanced electrostatic resistance is obtained, thereby preventing the undesired occurrence of a destruction of the internal elements of the LSI chip due to static electricity. In addition, by using the secondary transistor, and by switching the primary transistor to the OFF state after a specified period of time, the drain current flowing through the channel of the primary transistor can be reduced.

Preferably, the threshold voltage of the secondary transistor is higher than the threshold voltage of the primary transistor. More preferably, the threshold voltage of the secondary transistor is only slightly higher than the threshold voltage of the primary transistor, since the breakdown voltage can be minimized. With a semiconductor integrated circuit device according to this invention, by appropriately selecting the threshold voltage of the secondary transistor and by appropriately controlling the gate voltage of the primary transistor, the primary transistor can be switched between the ON state and the OFF state. Thus, breakdown will occur in a uniform manner. In addition, to the extent that the gate terminal is not grounded, a channel can be formed, at least to some extent, in the primary transistor. Thus, although there are some minor inconveniences in order to efficiently discharge the electrostatic discharge, the threshold voltage of the secondary transistor can be made lower than the threshold voltage of the primary transistor without any problem.

These and other features and advantages of the invention are described in or apparent from the following detailed description of the preferred embodiments.

BRIEF DESCRIPTION OF DRAWINGS,

The preferred embodiments of this invention will be described in detail, with reference to the following figures, wherein.

DETAILED DESCRIPTION OF PREFERRED EMBODIMENTS

Figure 1:
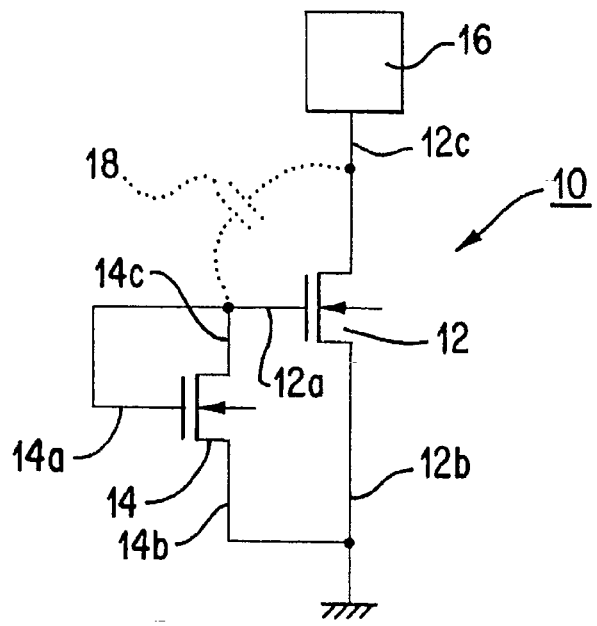
FIG. 1 is a circuit diagram of a first preferred embodiment of the protection circuitry of this invention.

FIG. 1 is a circuit diagram of a first preferred embodiment of the protection circuitry of this invention. The protection circuit 10 shown in FIG. 1 includes a primary NMOS transistor 12 and a secondary NMOS transistor 14. The source terminal 14b of the secondary transistor 14 is grounded, and the drain terminal 14c and the gate terminal 14a of the secondary transistor are short-circuited and are connected to the gate terminal 12a of the primary transistor 12. Thus, voltage on the gate terminal 14a and drain terminal 14c act as an applied to the gate terminal 12a of the primary transistor 12. In addition, the source terminal 12b of the primary transistor 12 is grounded and the drain terminal 12c is connected to the bonding pad 16 by an external connection. Furthermore, the threshold voltage of the secondary transistor 14 is higher than the threshold voltage of the primary transistor 12. In addition, as shown by the dotted line in FIG. 1, a parasitic capacitance 18 exists between the drain and gate of the primary transistor 12.

During normal operation of the protection circuit 10 shown in FIG. 1, for example, when the protection circuit 10 is operated with a power supply voltage of 5 V, the voltage of the gate terminal 12a of the primary transistor 12 may change slightly, due to the parasitic capacitance 18 which exists between the drain and gate of the primary transistor 12. However, the gate voltage is fixed to a ground potential due to the junction leakage current between the substrate and the drain of the secondary transistor 14. Thus, either the primary transistor 12 or the secondary transistor 14 is in the OFF state. That is, since the protection circuitry is electrically disconnected from the bonding pad 16, the protection circuitry does not influence the operation of the semiconductor integrated circuit device.

Next, if a voltage due to an electrostatic discharge is applied to the bonding pad 16, then corresponding to the increase in the voltage applied to the drain terminal 12c of the primary transistor 12, the parasitic capacitance 18 between its gate and drain will be charged, causing an increase in the gate voltage of the primary transistor 12. Then, when the gate voltage of the primary transistor 12 exceeds the threshold voltage, it switches to the ON state, and a channel is formed between the drain and the source of the primary transistor 12. Thus, a drain electrical current will begin to flow. Accordingly, the drain voltage of the primary transistor 12 will be clamped to the value corresponding to the ON resistance value of the channel formed between the drain and the source of the primary transistor 12 and the drain current. Therefore, the primary transistor which operates as NMOS transistor, will form a channel in the ON state, enabling the electrostatic discharge to discharge.

When the primary transistor 12 is in the ON state, if the drain voltage has already exceeded the pinch-off voltage, or if the drain voltage of the primary transistor 12 continues to increase and exceeds the pinch-off voltage, then the drain current of the primary transistor 12 will become a fixed value. However, the drain voltage continues to increase due to the electrostatic discharge. At the same time, when the drain voltage of the primary transistor 12 exceeds a specified value, a breakdown will occur in the p-n junction between the drain and substrate of the primary transistor 12, or punch-through will occur between the drain and source of the primary transistor 12. Thus, a drain current will begin to flow from the drain to the substrate, or from the drain to the source. In other words, the drain current drastically increases, and the drain voltage of the primary transistor 12 will be clamped to the value corresponding to the resistance between the drain and source and the resistance between the drain and substrate, and to the drain current.

Figure 9:
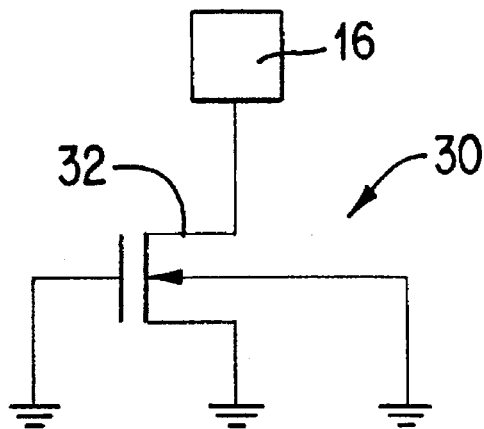
FIG. 9 is a circuit diagram of unused NMOS transistor in the output circuitry of a conventional semiconductor integrated circuit device.
Figure 10:
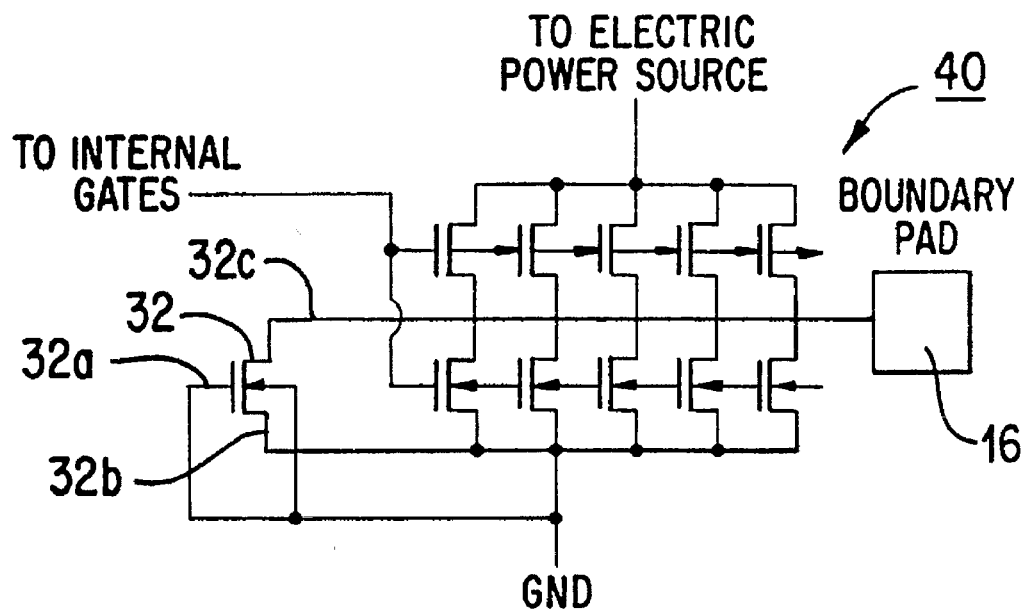
FIG. 10 is a circuit diagram of the output circuitry of a conventional semiconductor integrated circuit device.
Figure 11:
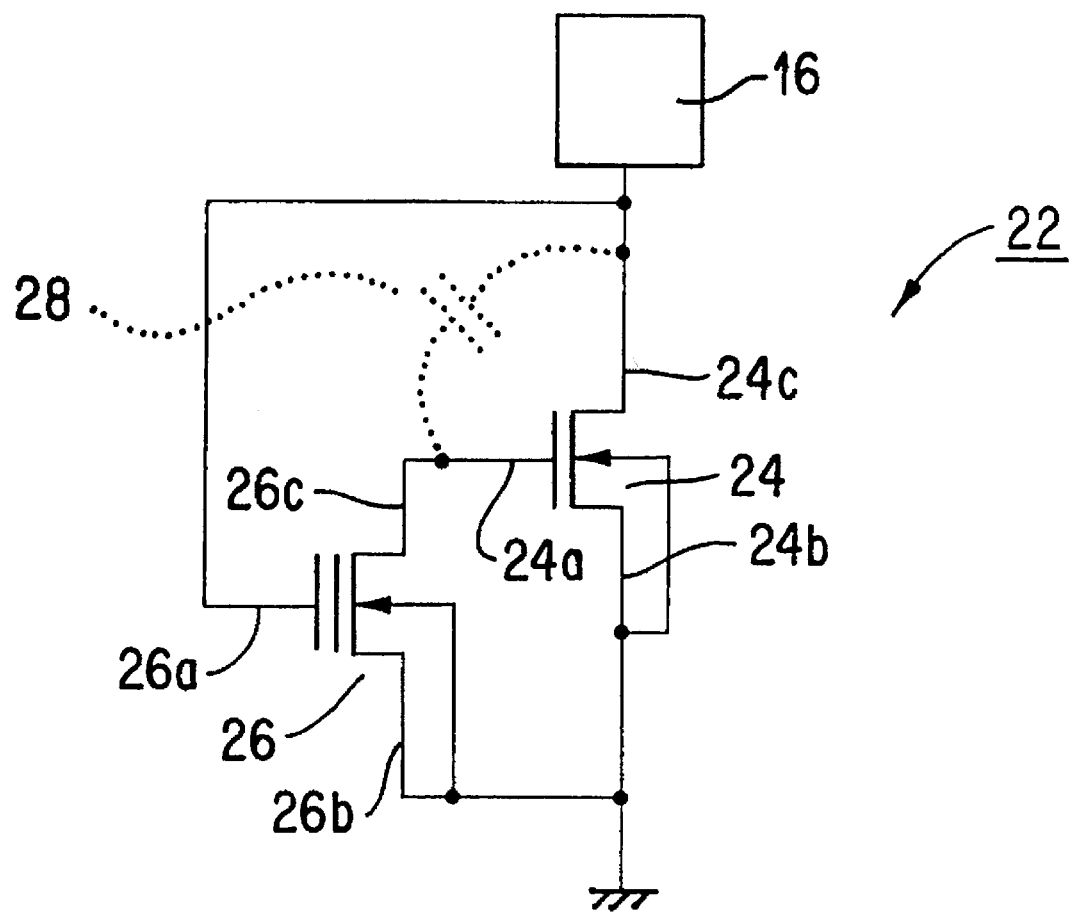
FIG. 11 is a circuit diagram of another conventional ESD protection circuit.

Additionally, since the primary transistor 12 is in the ON state, in comparison with the unused transistor 32 of the prior art semiconductor device 30 shown in FIG. 9, in which the source terminal 32b and the substrate of the unused transistor 32 are grounded, the breakdown occurs produced in the p-n junction between the drain and substrate of the primary transistor 12 at the pad voltage (the drain voltage of the primary transistor 12) lower by a few volts. In addition, when the breakdown occurs, a uniform current flow along the width of the gate is obtained. In other words, the current density is low, and there are no localized areas of high temperature. Thus, even if a great amount of current flow, no destruction of the primary transistor 12 will occur. Thus, the primary transistor 12 possesses enhanced electrostatic voltage resistance.

After the breakdown occurs, the drain voltage of the primary transistor 12 will increase corresponding to the increase in the drain current. Since the drain voltage of the primary transistor 12 will continue to increase, and since the current from the drain to the substrate will continue to flow, the electric potential of the substrate will increase. Thus, a forward current will begin to flow to the p-n junction between the source and the substrate of the primary transistor 12. This implies the operation of a parasitic npn bipolar transistor, where the substrate serves as a base, the drain serves as a collector and the grounded source serves as an emitter of the parasitic npn bipolar transistor. Adding the current due to the operation of the bipolar transistor to the current toward the substrate due to the breakdown, the drain current will drastically increase.

The parasitic capacitance 18 is further charged by the static electricity, and the gate voltage of the secondary transistor 14 increases. The secondary transistor 14 is switched to the ON state when the gate voltage exceeds the threshold voltage. In this instance, since the drain terminal 14c of the secondary transistor 14 and the gate terminal 14a are short-circuited, the secondary transistor 14 pulls off its own gate voltage. When its gate voltage falls below the threshold voltage, it switches to the OFF state.

The parasitic capacitance 18 will be recharged by the static electricity. The secondary transistor will again be switched to the ON state, when the gate voltage of the secondary transistor 14 returns to a value which is higher than the threshold voltage. Thus, while the parasitic capacitance 18 is charged by the static electricity, namely while the drain voltage of the primary transistor 12 is increasing due to the static electricity, the gate terminal of the secondary transistor 14 and the gate terminal 12a of the primary transistor 12 are clamped to the threshold voltage of the secondary transistor 14. As a result, since the threshold voltage of the secondary transistor 14 is higher than the threshold voltage of the primary transistor 12, the primary transistor 12 is maintained in the ON state.

Subsequently, after the drain current of the primary transistor 12 reaches a peak value, it begins to decrease. Since its drain voltage also begins to decrease, the gate voltage of the primary transistor 12 and the secondary transistor 14 are pulled off through the parasitic capacitance 18. After the gate voltage of the secondary transistor 14 falls below its own threshold voltage, it is switched completely to the OFF state. In the same manner, when the gate voltage of the primary transistor 12 falls below its own threshold voltage, its MOS operation is switched to the OFF state. This functions to cut off the flow of the discharge current through the channel, at the same as which the primary transistor 12 remains in the snap-back region for an extended period.

Along with a continuing decrease in the drain current of the primary transistor 12, the drain voltage of the primary transistor 12 also continues to decrease. After the drain voltage falls below the breakdown voltage of the primary transistor 12, the parasitic bipolar npn transistor of the primary transistor 12 returns to the OFF state. Subsequently, the discharge current flows as the leakage current of the p-n junction between the drain and the substrate of the secondary transistor 14. In addition, as the drain voltage of the primary transistor 12 decreases, its gate voltage is pulled off through the parasitic capacitance 18, and becomes a ground electric potential, or a negative potential. After the drain voltage of the primary transistor 12 falls to the ground potential, the gate voltage of the primary transistor 12 is fixed to a ground potential due to a junction leakage current between the drain and substrate of the secondary transistor 14.

Figure 12:
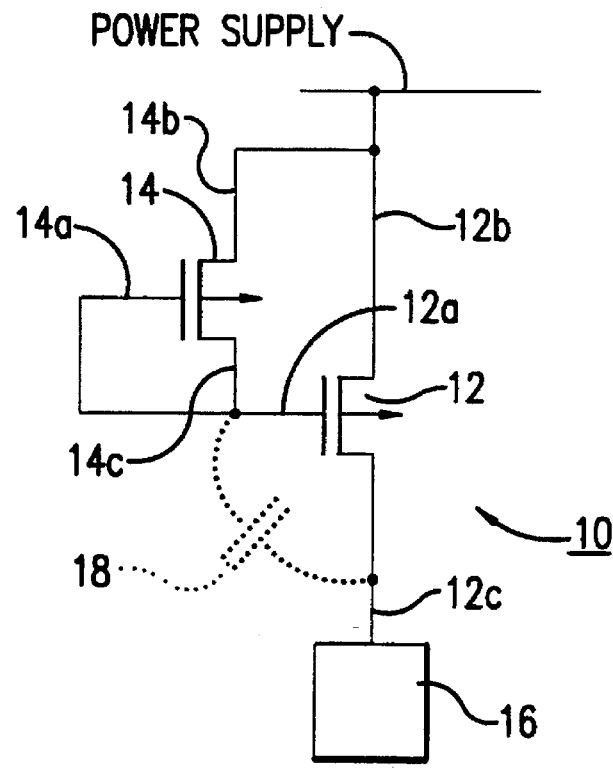
FIG. 12 is a circuit diagram of the first preferred embodiment of the protection circuitry of this invention using PMOS transistors.

The above-outlined first preferred embodiment of this invention includes an NMOS transistor. However, the protection circuitry of the semiconductor integrated circuit device according to this invention is not limited to this first preferred embodiment. Thus, the protection circuitry of the semiconductor integrated circuit device according to this invention may use a PMOS transistor, as shown in FIG. 12. In addition, the relationship between the threshold voltage of the primary transistor 12 and that of the secondary transistor 14, as explained with respect to the first preferred embodiment of this invention, is not particularly restricted. Furthermore, the semiconductor integrated circuit device according to the first preferred embodiment of this invention may be appropriately applied to either the input pad or to the output pad.

Figure 2:
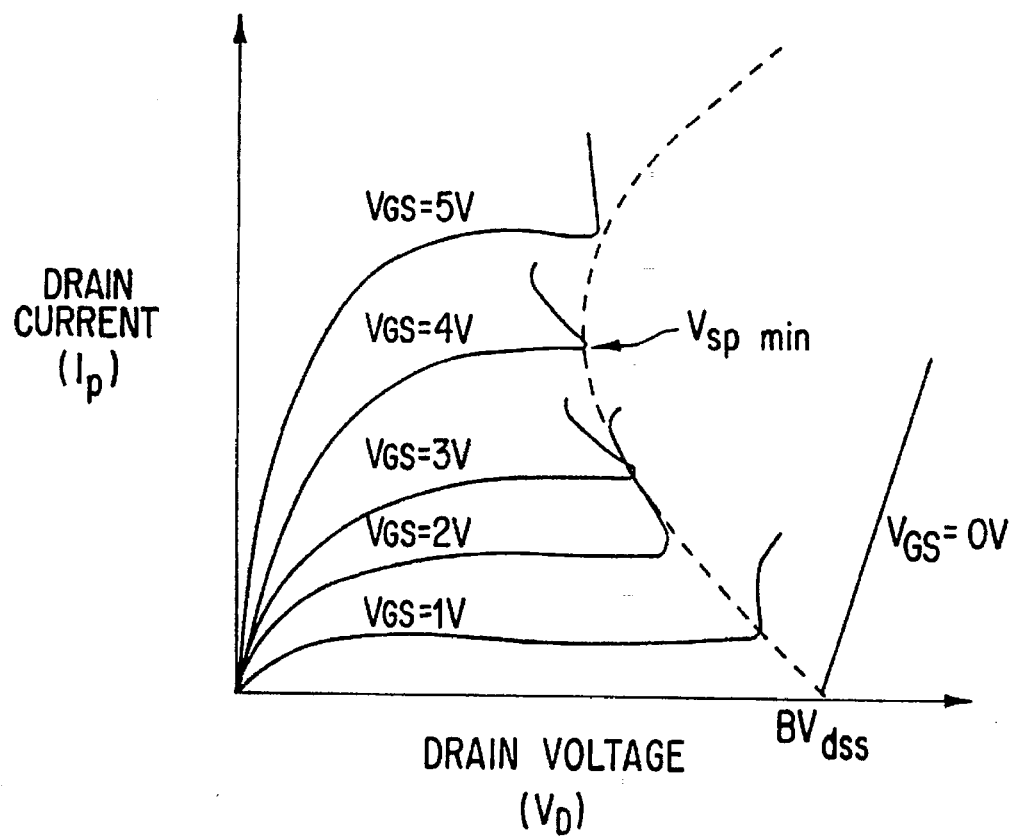
FIG. 2 is a graph showing the relationship between the drain voltage and the drain current of the NMOS transistor.

An explanation of the snap-back phenomenon will be made with reference to FIG. 2. FIG. 2 shows a graph of the relationship between the drain voltage of a MOS transistor. When the drain voltage is zero volts, there is no flow of the drain current until the drain voltage reaches the breakdown voltage $BVds_o$. However, when the drain voltage reaches the breakdown voltage $BV_{dss}$, the junction between the drain and the substrate breaks down, resulting in the sudden flow of electric current to the substrate. If the drain voltage continues to increase and current continues to flow to the substrate, the electric potential of the substrate increases. In this state the forward direction current begins to flow to the p-n junction between the substrate and the source. This means that the transistor operates as a parasitic npn bipolar transistor, formed by the substrate, which is grounded and serves as a base, the drain, which serves as a collector, and the grounded source, which serves as an emitter. Adding the current due to the bipolar transistor to the current flowing to the substrate due to breakdown, the drain current drastically increases.

When the gate voltage $V_{GS}$ is 1 volt, since there is a slight formation of a channel in the NMOS transistor, along with the increase in the drain voltage, the drain current through the channel increases. After the drain voltage reaches the pinch-off voltage, the drain current becomes saturated, and the drain current is maintained at a fixed value even though the drain voltage continues to increase. When it reaches the snap-back region shown by the dotted line shown in FIG. 2, the p-n junction between the drain and the substrate uniformly breaks down. Following the breakdown, the transistor operates in the same manner as when the gate voltage was zero volts.

As shown in FIG. 2, as the gate voltage increases, the drain voltage in the snap-back region, namely the breakdown voltage, is decreased. However, if the gate voltage is 5 V, then, conversely, the breakdown voltage increases. It is known that the breakdown voltage of a MOS transistor reaches the minimum value $V_{sp\ min}$ when the gate voltage of the MOS transistor is slightly higher than its threshold voltage. In this manner, as the gate voltage is increased, the breakdown voltage at first decreases, and then increases again after the gate voltage slightly exceeds the threshold voltage. This phenomenon is called 'snap-back'. The relationship between the gate voltage and the breakdown voltage is referred to as the snap-back region in the area shown by the dotted line shown in FIG. 2.

Figure 3:
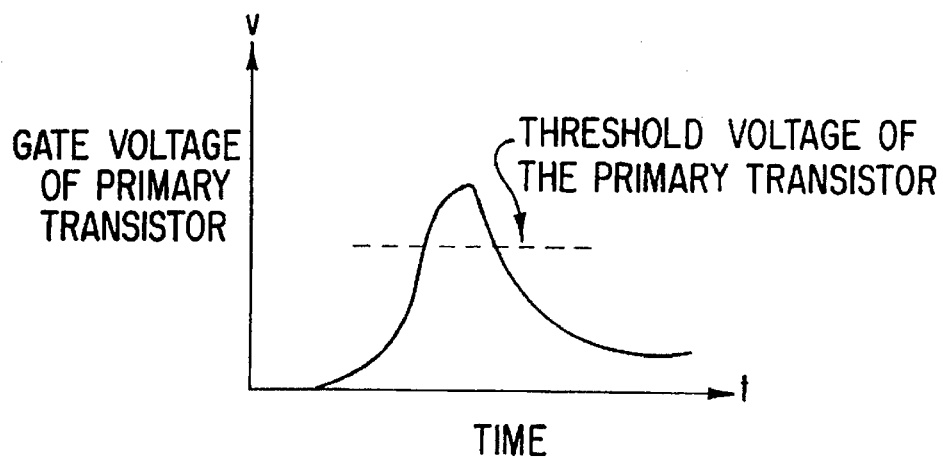
FIG. 3 is a graph showing the change in gate voltage of the primary transistor of the protection circuitry of this invention during an ESD event.

FIG. 3 shows a graph which reflects the changes in the gate voltage of the primary transistor 12 in the first preferred embodiment of this invention as a function of time. The reasons for switching the primary transistor 12 as a MOS into the ON state are as follows: 1) form the channel between its drain and source flow the discharge current at first through the channel; 2) decrease the breakdown voltage of the p-n junction between the drain and the substrate; and 3) make the current flows uniform along the width direction of the gate when breakdown occurs, in order to decrease the current density. In the same manner, the reasons for switching the primary transistor 12, as a MOS, into the OFF state are as follows: 1) if the primary transistor 12 remains in the ON state for an extended period of time, then a great amount of current flows in the channel formed between its drain and source, and a channel type breakdown easily occurs; and 2) decreasing the gate voltage of the primary transistor 12 keeps the primary transistor 12 in the snap-back region for an extended period, making the primary transistor 12 easy to operate as the bipolar transistor, thus reducing the drain current flow through the channel.

Figure 4:
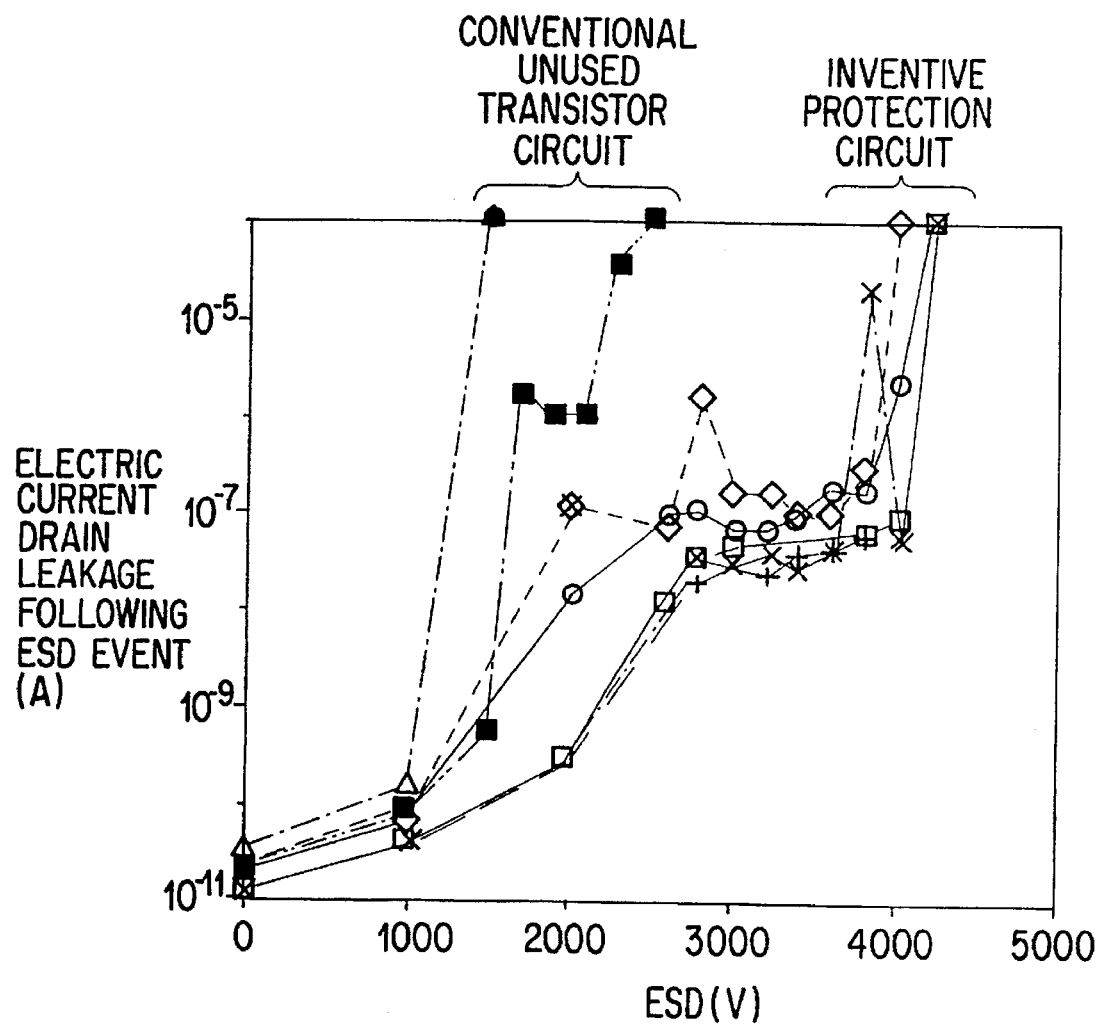
FIG. 4 is a graph showing the relationship between the drain leakage current and the ESD voltage for the protection circuitry of this invention and for the unused transistor of the conventional semiconductor integrated circuit device.

FIG. 4 shows a graph comparing ESD experimental results using the unused transistor 32 of the conventional semiconductor integrated circuit device 30 with the protection circuit 10 of the first preferred embodiment of this invention. The graph shown in FIG. 4 uses a plurality of samples of the unused transistor 32 shown in FIG. 9 and the protection circuitry 10 of the first preferred embodiment of this invention, as shown in FIG. 1. The graph of FIG. 4 shows the drain leakage current of each of the plurality of samples after the ESD voltage is applied. As shown in FIG. 4, if the electrostatic voltage resistance of the transistor is defined as the applied ESD voltage at which a drain leakage current of at least 10 µA is observed, then the protection circuitry 10 according to the first preferred embodiment of this invention has an electrostatic voltage resistance greater than two times that of the conventional unused transistor 32.

Figure 5:
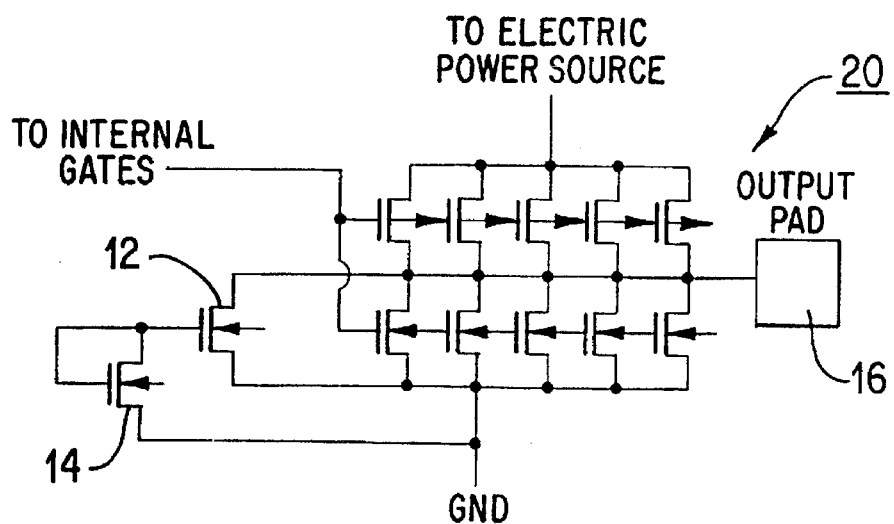
FIG. 5 is a circuit diagram of the first embodiment of the protection circuitry of this invention used for an output buffer.
Figure 13:
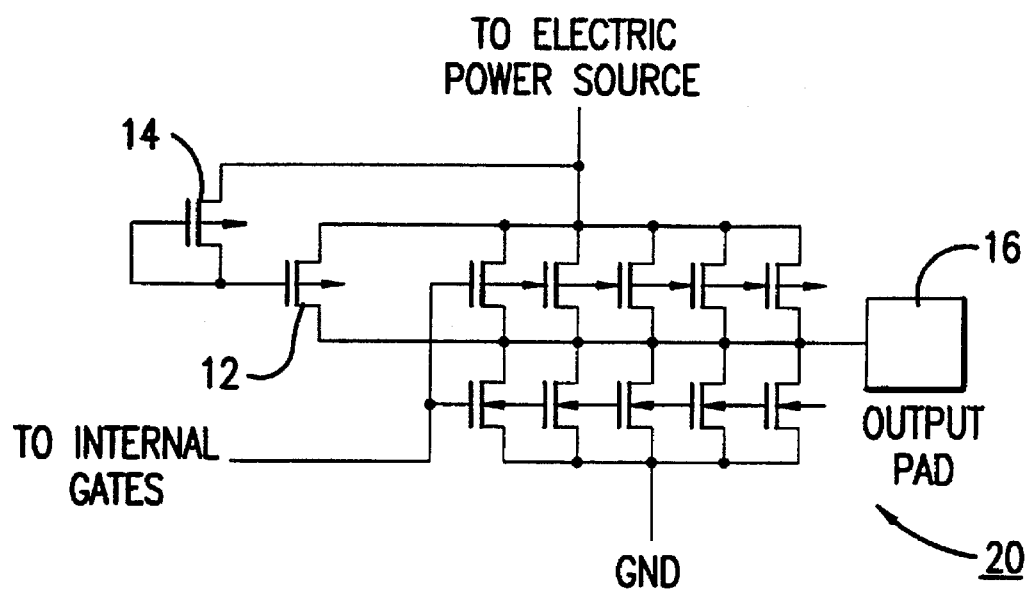
FIG. 13 is a circuit diagram of the first embodiment of the protection circuitry of this invention used for an output buffer and using PMOS transistors.

FIG. 5 shows the protection circuitry of the first preferred embodiment of this invention used as the protection circuitry of an output buffer 20. The output buffer 20 includes an inverter formed by five PMOS transistors and five NMOS transistors. As shown in FIG. 5, by using the first preferred embodiment of the protection circuitry of this invention in the output buffer 20, since the electrostatic discharge is discharged to ground through the primary transistor 12, enhanced or improved electrostatic voltage resistance can be provided to the LSI chip. FIG. 13 shows the circuit of FIG. 5 using PMOS transistors in the protection circuitry in place of the NMOS transistors used in the protection circuitry of FIG. 5. Additionally, destruction of the internal elements of the LSI chip due to an electrostatic discharge, which might occur in the five PMOS transistors and the five NMOS transistors in the embodiment shown in FIG. 5, can be prevented. Furthermore, as is the case with the gate array and the like of an LSI chip, in the output buffer 20, where unused transistors are available, then the protection circuitry of the first preferred embodiment of this invention can be constructed using the available unused transistors as the primary and second transistors. Thus, it should be appreciated that, since all of the unused transistors have the same operating characteristics, including the threshold voltage, the first and second transistors can also have the same threshold voltage.

Figure 6:
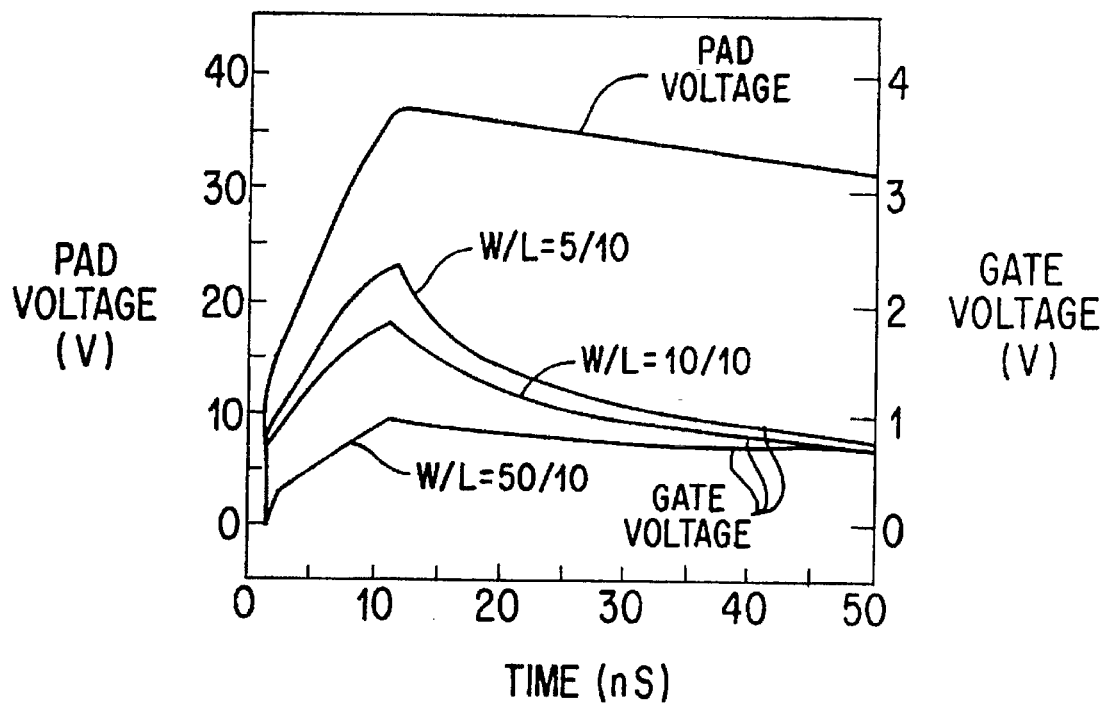
FIG. 6 is a graph showing the pad voltage and the gate voltage of the primary transistor as a function of time for the first preferred embodiment of this invention.

FIG. 6 shows the relationship between the pad voltage and the gate voltage of the primary transistor 12 where the ratio of W/L (gate size) of the secondary transistor 14 is changed in the protection circuitry of the first preferred embodiment of this invention. As shown in FIG. 6, the gate voltage of the primary transistor 12 increases as the pad voltage increases, because the parasitic capacitance 18 of the primary transistor 12 is charged. After the secondary transistor 12 is switched to the ON state, the gate voltage of the primary transistor is pulled off and kept at the threshold voltage of the secondary transistor 12. After the secondary transistor 12 is switched to the OFF state, the gate voltage is pulled off and reduced by the leakage current between the drain and the substrate of the secondary transistor. In addition, when the ratio W/L of the secondary transistor 14 is enlarged, or as shown in the graph of FIG. 6, when the gate width (W) relative to the gate length (L) is increased, the ON resistance of the secondary resistor 14 becomes smaller. Thus, if the amount of current flowing through the secondary transistor 14 is constant, the voltage across the secondary transistor 14 becomes smaller.

Accordingly, in comparison with the W/L ratio of the primary transistor 12, as the W/L ratio of the secondary transistor 14 becomes larger, the gate voltage of the primary transistor 12 is quickly pulled off to the threshold voltage of the secondary transistor 14. Conversely, as the W/L ratio of the secondary transistor 14 becomes smaller, then the gate voltage of the primary transistor is slowly pulled off to the threshold voltage of the secondary transistor 14. Furthermore, by appropriately selecting the ratio of W/L of the secondary transistor 14, time constants, that is, a time period during which the gate voltage of the primary transistor 12 is decreasing, can be changed as desired. In other words, the gate voltage of the primary transistor 12 can be precisely controlled. With the protection circuitry 10 of the first preferred embodiment of this invention, in order to provide an appropriate ON time for the primary transistor 12, the W/L ratio of the secondary transistor 14 is preferably smaller than the W/L ratio of the primary transistor 12.

Figure 7:
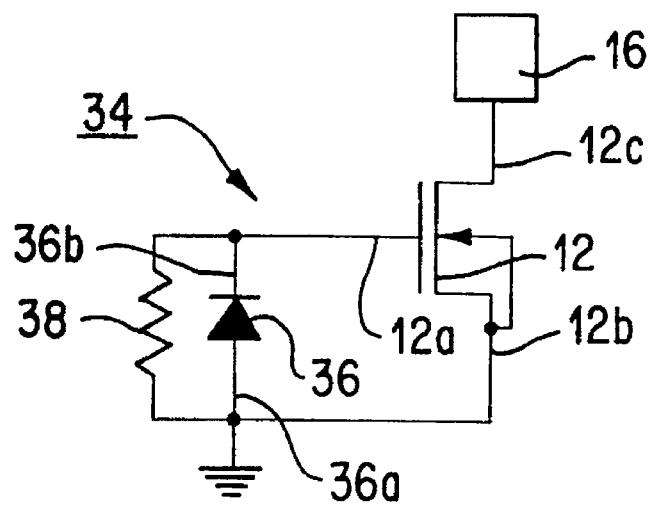
FIG. 7 is a circuit diagram of a second preferred embodiment of the protection circuitry of this invention.
Figure 8:
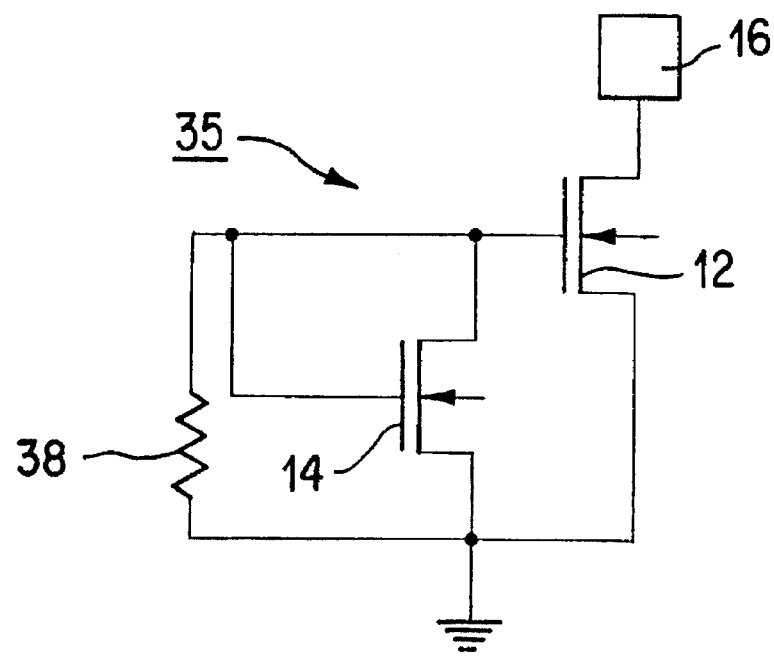
FIG. 8 is a circuitry diagram of a third preferred embodiment of the protection circuitry of this invention.
Figure 14:
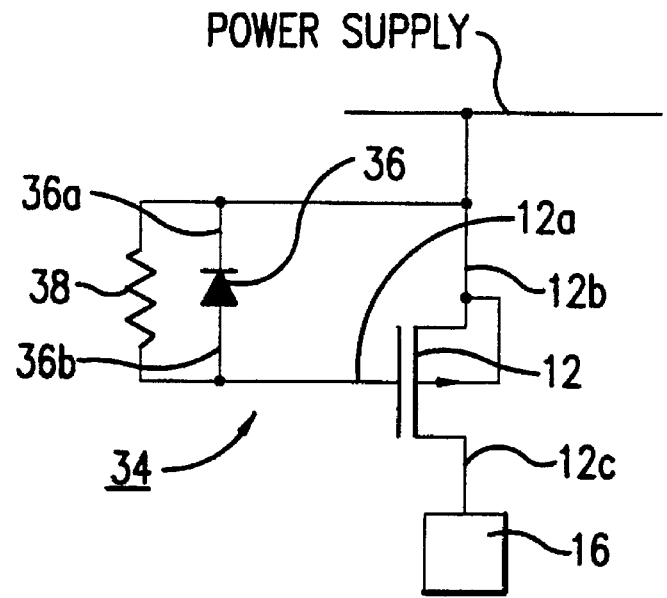
FIG. 14 is a circuit diagram of the second preferred embodiment of the protection circuitry of this invention using PMOS transistors.
Figure 15:
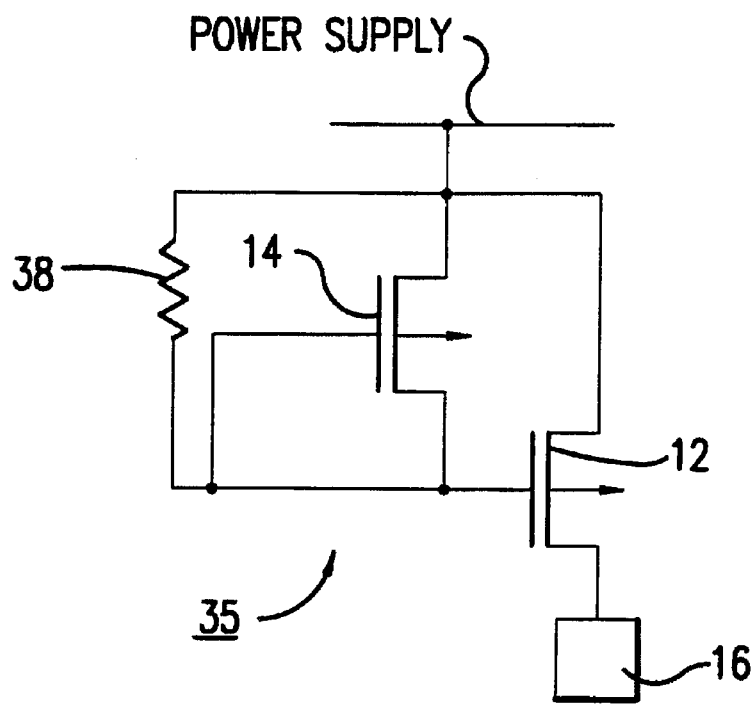
FIG. 15 is a circuit diagram of the third preferred embodiment of the protection circuitry of this invention using PMOS transistors.

FIGS. 7 and 8 show, respectively, a second preferred embodiment and a third preferred embodiment of the protection circuitry of this invention. In the second and third preferred embodiments, the protection circuitry of this invention includes NMOS transistors. However, the protection circuitry of this invention may also include PMOS transistors, as shown in FIGS. 14 and 15. The protection circuitry 34 as shown in FIG. 7, comprises the primary transistor 12, a diode 36, and a resistive element 38. In this second preferred embodiment, the source terminal 12b of the transistor 12 is connected to ground. The drain terminal 12c is connected to the pad 16 for an external connection. The gate terminal 12a is grounded through the resistive element 38. In addition, the P-side terminal (the anode terminal) 36a of the diode 36 is connected to ground, while the N-side terminal (the cathode terminal) 36b is connected to the gate terminal 12a of the transistor 12. Furthermore, although not shown in the diagram, a parasitic capacitance exists between the drain and gate of the primary transistor 12.

The protection circuitry 34 includes the diode such as $N^+P^-$ diode, which can be used in lieu of the secondary transistor 14 of the protection circuitry 10. Furthermore, since the gate terminal 12a of the primary transistor 12 is grounded through the resistance element 38, in comparison with the protection circuitry 10 shown in FIG. 1, further miniaturization is possible. In addition, during ordinary usage of the protection circuitry 10, the electric potential (gate voltage) of the gate terminal 12a of the primary transistor 12 can be fixed to the ground potential through pulling off by the leakage current between the drain and substrate of the secondary transistor 14, which needs a relatively long period. With the protection circuitry 34, since temporary pulling off can be accomplished very quickly through the resistive element 38, enhanced stability is possible.

Similar to the secondary transistor 14 of the protection circuitry 10 shown in FIG. 1, which can be switched into the ON state by the voltage applied to the gate terminal 14a, the diode 36 can be switched into the On state (or breakdown state) by the reverse voltage being applied across the diode 36. So, the breakdown voltage of the diode 36 is desirably approximately equal to the threshold voltage of the secondary transistor 14 of the semiconductor integrated circuit device 10 shown in FIG. 1. The diode 36 can also be connected in the forward direction, i.e., the N-side terminal 36b can be grounded and the P-side terminal 36a can be connected to the gate terminal 12a of the transistor 12. In addition, the resistive element 38, forms a parallel resistance with the ON resistance of the diode 36 when the diode 36 breaks down. The parallel resistance value is desirably appropriately selected so that it can appropriately control the gate terminal 12a of the transistor 12.

The third preferred embodiment of the protection circuitry 35, as shown in FIG. 8, includes the primary transistor 12, the secondary transistor 14, and the resistive element 38. The protection circuitry 35 includes, in addition to the protection circuitry 10 shown in FIG. 1, the gate terminal 12a of the primary transistor 12. That is, the gate terminal 14a and the drain terminal 14b of the secondary transistor 14 are grounded through the resistance element 38. As indicated above, in ordinary usage, the electric potential of the gate terminal 12a of the primary transistor 12 can be quickly pulled off through the resistance element 38, thus providing enhanced stability. Similarly to the protection circuitry 34 shown in FIG. 7, since the resistive element 38 forms a parallel resistance with the ON resistance of the secondary transistor 14, the parallel resistance value should be appropriately selected to be capable of appropriately controlling the gate terminal 12a of the primary transistor 12.

As explained in detail above, the protection circuitry of the preferred embodiments of this invention include a primary transistor which discharges the electrostatic discharge applied to the bonding pad 16 to ground. The protection circuitry may also include, as the controlling circuitry, a secondary transistor which is small in size and which controls the primary transistor. Thus, when a voltage due to an electrostatic discharge is applied, by switching the primary transistor to the ON state, the breakdown voltage of the primary resistor can be decreased. When a breakdown occurs, the discharge current can be uniformly grounded through the primary transistor, without deterioration of the primary transistor itself due to the electrostatic discharge, thereby enabling the rapid discharge of large discharge currents due to the electrostatic discharge.

Furthermore, the protection circuit of the preferred embodiments of this invention, as input protection circuitry, or as the protection circuitry of the transistors and the output buffer, provides enhanced electrostatic voltage resistance of LSI chips, thereby preventing destruction of the internal elements of the LSI chips caused by electrostatic discharge. In addition, according to the protection circuitry of this invention, since transistors which have ordinary thin gate oxide films are used, the protection circuitry according to this invention can be manufactured using the conventional manufacturing processes, without any changes in the manufacturing process of a standard semiconductor integrated circuit device. In addition, according to the protection circuitry of this invention, since the operation begins at a low voltage due to the electrostatic discharge, the danger that the internal elements of the LSI chip are exposed to the electrostatic pulses over an extended period of time is extremely small. In addition, the secondary transistor, even though the size is small, has a high switching speed. So, even the electrostatic pulse with a high rise speed can be rapidly discharged. Furthermore, the protection circuitry according to this invention can be used, in the same manner, as a trigger circuitry to a thyristor used as a protective element.

What is claimed is:

1. An electrostatic discharge protection circuit, comprising:

a primary transistor, comprising:

a drain connected to a circuit element of a circuit to be protected, an electrostatic discharge being applied through the circuit element, a source connected to one of ground and a power supply, and a gate, wherein a parasitic capacitance exists between the drain and the gate; and a gate voltage controlling circuit having at least a first terminal and a second terminal, the first terminal connected to one of ground and the power supply and the second terminal connected to the gate of the primary transistor, the gate voltage controlling circuit controlling a gate voltage of the primary transistor to maintain the gate voltage such that a drain-to-source breakdown voltage when an electrostatic discharge is applied to the circuit element is lower than a drain-to-source breakdown voltage when the gate voltage is substantially identical to a source voltage of the primary transistor.

2. The electrostatic discharge protection circuit of claim 1, wherein the gate voltage controlling circuit comprises a secondary transistor, the secondary transistor comprising:

a source forming the first terminal and connected to one of ground and the power supply;

a gate; and a drain forming the second terminal;

wherein the gate and the drain of the secondary transistor are connected to the gate of the primary transistor.

3. The electrostatic discharge protection circuit of claim 2, wherein the primary and secondary transistors are NMOS transistors.

4. The electrostatic discharge protection circuit of claim 3, wherein the source of the primary transistor and the source of the secondary transistor are connected to ground.

5. The electrostatic discharge protection circuit of claim 2, wherein a ratio of a gate width to a gate length of the secondary transistor is less than a ratio of the gate width to the gate length of the primary transistor.

6. The electrostatic discharge protection circuit of claim 2, wherein a threshold voltage of the secondary transistor is greater than a threshold voltage of the primary transistor.

7. The electrostatic discharge protection circuit of claim 2, further comprising a resistive element connected between the gate of the primary transistor and ground.

8. The electrostatic discharge protection circuit of claim 2, wherein the primary and secondary transistors are PMOS transistors.

9. The electrostatic discharge protection circuit of claim 8, wherein the source of the primary transistor and the source of the secondary transistor are connected to the power supply.

10. The electrostatic discharge protection circuit of claim 1, wherein the gate voltage controlling circuit comprises a diode and a resistive element, the first terminal comprising one of an anode and a cathode of the diode and the second terminal comprising the other of the anode and the cathode of the diode, the resistive element and the first terminal being connected between the gate of the primary transistor and one of ground and the power supply, and the second terminal of the diode being connected to the gate of the primary transistor.

11. The electrostatic discharge protection circuit of claim 10, wherein the primary transistor is an NMOS transistor.

12. The electrostatic discharge protection circuit of claim 11, wherein the source of the primary transistor, the resistive element, and the anode of the diode are connected to ground.

13. The electrostatic discharge protection circuit of claim 10, wherein the primary transistor is a PMOS transistor.

14. The electrostatic discharge protection circuit of claim 13, wherein the source of the primary transistor, the resistive element, and the cathode of the diode are connected to the power supply.

15. A protection circuit for discharging an electrostatic voltage applied to a pad, comprising:

a MOS transistor discharging the electrostatic voltage to one of ground and a power supply and having a drain, a source, and a gate, the drain of the MOS transistor coupled to the pad, the source of the MOS coupled to one of ground and the power supply, the MOS transistor having a first drain-to-source breakdown voltage when a voltage of the gate of the MOS transistor is substantially identical to a voltage of the source;

a capacitor coupled between the drain and the gate; and a controlling circuit having at least a first terminal and a second terminal, the first terminal connected to one of ground and the power supply and the second terminal connected to the gate of the MOS transistor, the controlling circuit controlling the voltage of the gate by adjusting a pull-off current from an electrode of the capacitor coupled to the gate in response to a voltage of the gate, the controlling circuit maintaining the voltage of the gate such that a second drain-to-source breakdown voltage when the electrostatic voltage is applied to the pad is lower that the first drain-to-source breakdown voltage.

16. The protection circuit of claim 15, wherein the capacitor is a drain-gate parasitic capacitor of the MOS transistor.

17. The protection circuit of claim 15, wherein the MOS transistor is an NMOS transistor and the source of the NMOS transistor is connected to ground.

18. The protection circuit of claim 17, wherein the controlling circuit comprises a second NMOS transistor having a source forming the first terminal and a drain forming the second terminal, a gate and the drain of the second NMOS transistor being coupled to the gate of the NMOS transistor and the source of the second NMOS transistor being coupled to ground.

19. The protection circuit of claim 18, wherein a ratio of a width and a length of the gate of the second NMOS transistor is less than a ratio of a width and a length of the gate of the NMOS transistor.

20. The protection circuit of claim 18, wherein a threshold voltage of the second NMOS transistor is higher than a threshold of the NMOS transistor.

21. The protection circuit of claim 18, wherein the controlling circuit further comprises a resistive element connected between the gate of the NMOS transistor and ground.

22. The protection circuit of claim 17, wherein the controlling circuit comprises a resistive element connected between the gate of the NMOS transistor and ground and a diode, a cathode of the diode coupled to the gate of the NMOS transistor and an anode of the diode coupled to ground.

23. The protection circuit of claim 15, wherein the MOS transistor is a PMOS transistor and the source of the PMOS transistor is connected to the power supply.

24. The protection circuit of claim 23, wherein the controlling circuit comprises a second PMOS transistor having a source forming the first terminal and a drain forming the second terminal, a gate and the drain of the second PMOS transistor being coupled to the gate of the PMOS transistor and the source of the second PMOS transistor being coupled to the power supply.

25. The protection circuit of claim 24, wherein a ratio of a width and a length of the gate of the second PMOS transistor is less than a ratio of a width and a length of the gate of the PMOS transistor.

26. The protection circuit of claim 24, wherein a threshold voltage of the second PMOS transistor is higher than a threshold of the PMOS transistor.

27. The protection circuit of claim 24, wherein the controlling circuit further comprises a resistive element connected between the gate of the PMOS transistor and the power supply.

28. The protection circuit of claim 23, wherein the controlling circuit comprises a resistive element connected between the gate of the PMOS transistor and the power supply and a diode, a anode of the diode coupled to the gate of the PMOS transistor and an cathode of the diode coupled to the power supply.

29. A protection circuit for discharging an electrostatic voltage applied to a pad, comprising:

a MOS transistor discharging the electrostatic voltage to one of ground and a power supply, a drain of the MOS transistor coupled to the pad, a source of the MOS coupled to one of ground and the power supply;

a capacitor coupled between the drain and the gate; and a controlling circuit controlling the voltage of the gate by adjusting a pull-off current from an electrode of the capacitor coupled to the gate in response to a voltage of the gate, the controlling circuit maintaining the voltage of the gate such that a channel of the MOS transistor opens during a period when the electrostatic voltage is rising and such that the channel of the MOS transistor closes after the electrostatic voltage reaches a peak value.

* * * * *